Figure 2:
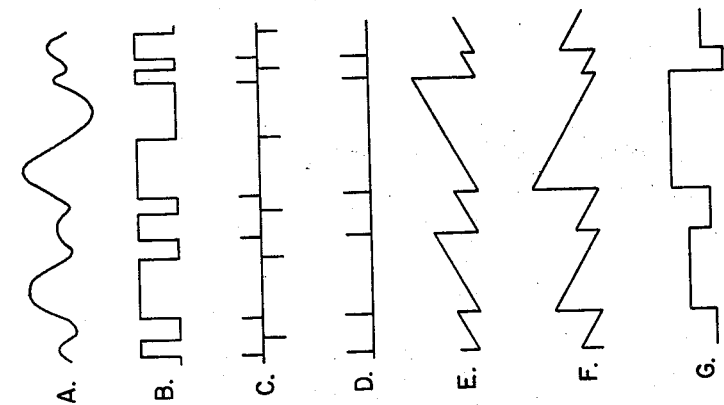

Dec. 25, 1962  K. N. BURNS  3,070,776
SEISMIC RECORDING METHOD
Filed March 6, 1959  2 Sheets-Sheet 1

Kay N. Burns  Inventor

By James A. Reilly  Attorney

Dec. 25, 1962     K. N. BURNS     3,070,776
SEISMIC RECORDING METHOD
Filed March 6, 1959     2 Sheets-Sheet 2
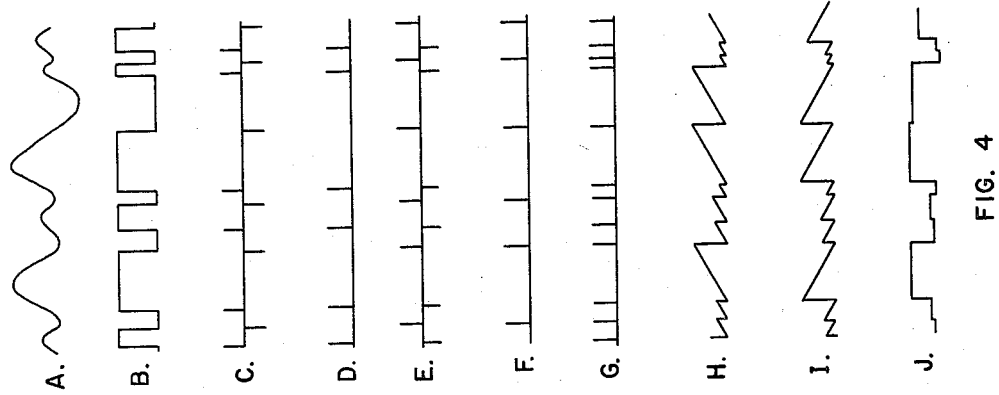
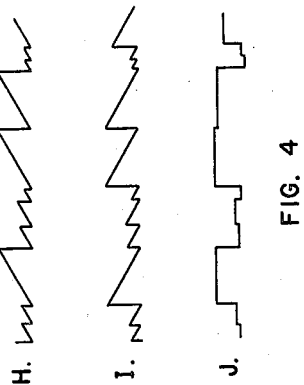
Kay N. Burns     Inventor
By James A. Reilly Attorney

United States Patent Office 3,070,776
Patented Dec. 25, 1962

3,070,776
SEISMIC RECORDING METHOD
Kay N. Burns, Tulsa, Okla., assignor to Jersey Production Research Company, a corporation of Delaware
Filed Mar. 6, 1959, Ser. No. 797,644
13 Claims. (Cl. 340—15)

The present invention relates to the recording of seismic information and more particularly relates to an improved system for detecting frequency changes in seismic signals and recording information concerning such changes as a variable density or variable color record in which the intensity of the record is a function of the signal frequency.

Seismic methods are widely employed in prospecting for subterranean deposits of minerals, petroleum and natural gas. Such methods involve in essence the generation of an impulse at or near the earth's surface under conditions such that an elastic wave having a frequency spectrum within the seismic range is transmitted downwardly into the earth and the subsequent detection and identification of resulting energy waves reflected from discontinuities within the earth. Generally the impulse which sets up the elastic wave is produced by the detonation of a high explosive charge in a shot hole, but other methods, weight dropping for example, are also used. When a wave thus generated encounters strata of varying densities or other subsurface discontinuities as it travels downwardly from the surface, at least a part of the energy in the wave is reflected and returned toward the surface. The wave energy reaching the surface is picked up by one or more seismic detectors or geophones positioned at locations remote from the point where the wave was initially generated. These detectors or geophones act as transducers and convert the wave energy detected into electrical transients. These electrical transients generally form complex sinusoidal-type signals varying in amplitude with time and having prominent variations in amplitude corresponding to the arrival of the reflected waves. The wave form of the detected signal may vary greatly depending upon the number and location of the discontinuities in the subsurface structure.

By noting the time at which a seismic impulse is initiated and subsequently measuring the elapsed time required for seismic waves to be reflected to one or more seismic detectors from subsurface discontinuities, much useful information concerning the nature and depth of the discontinuities can be obtained. To secure this information, a seismograph is used to record the moment at which the seismic impulse was generated and the times at which the reflected waves reached the detectors. The detectors are spaced at known distances from the point of impulse. Information as to the time required for an impulse to reach a known point on the surface a known distance from the point of impulse, coupled with information as to the rate at which an elastic wave travels in the subsurface structure, permits the depth of the reflecting strata to be computed. By observing changes in the character of the reflected waves reaching the surface, information as to the nature of the subsurface structure can be obtained.

Seismographs employed in this manner normally record the signal from each seismic detector or selected group of detectors as a separate trace upon a seismogram, each trace comprising a record of the variations with time in the output of the detector or detectors associated with the trace. Early seismographs generally recorded the output of the detector or group of detectors as an oscillographic trace formed by the movement of a suitable tracing pin or beam of light across a recording chart or a photographic film. In recent years, such apparatus has largely been supplanted by seismographs which record the seismic detector signals as variable density photographic traces, variable area photographic traces, magnetic traces and similar readily reproducible traces. The use of such equipment has been spurred by the development of apparatus which permits a reproducible trace to be recorded, subsequently corrected to compensate for undesirable components of the trace, and then rerecorded.

Since the accuracy of seismic exploration methods depends largely upon the extent to which a trained observer can analyze the recorded seismic information, it is important that a recording system productive of the maximum amount of useful information be employed. It has been found that variable density recording systems in which the signal is reproduced as a photographic trace which varies in intensity along its length in proportion to the intensity of the signal are more easily analyzed than other types of seismic records. A number of methods for producing such variable density photographic records are known. A highly effective system is described in U.S. Patent No. 2,769,683, "Variable Density Recording of Galvanometer Motion" by Jesse D. Skelton, issued November 6, 1956. Despite their advantages, however, variable density recording methods are not entirely satisfactory for the reason that they do not readily reflect changes in the frequency of the seismic signal being recorded. This shortcoming is of considerable importance because it is known that changes in the frequency of a seismic signal may be related to subsurface conditions which often have a profound significance to the trained geologist or geophysicist. By studying frequency changes with respect to time on a number of correlated seismic records, those skilled in the art can often obtain valuable information as to the porosity, bed thickness, slope, dip extent, and other characteristics of subsurface formations.

The present invention provides a new and improved method for recording seismic information which readily permits the detection of frequency changes in a seismic signal. In accordance with the invention, it has now been found that by employing a system wherein changes in the signal polarity from positive to negative or from negative to positive values are detected and used to generate a sawtooth signal which is then in effect reversed upon itself, a record in which the intensity is proportional to the cycle breadth and inversely proportional to the frequency of the original signal can be obtained.

In one embodiment of the invention, a seismic signal obtained from a magnetic tape or similar recording system in which the signal is reproduced as a series of electrical transients is fed to a limiter and differentiator circuit which produces a series of pulses corresponding in time and position to the points at which polarity of the input signal changes. Each change in input signal polarity triggers a linearly rising voltage ramp. The next succeeding change in polarity resets the ramp voltage to zero and triggers its upward rise again. In this manner the conventional sinusoidal input signal is converted into a signal made up of a series of sawtooth events. The duration and height of each sawtooth event are proportional to the half-cycle breadth or frequency of the original input seismic signal. The signal thus generated is recorded on magnetic tape or upon a photographic film. If a photographic recording system is employed, either variable density or variable color recording may be used. A similar, but reversed, signal is then generated by replaying the original magnetic tape through the system in reverse. The reversed sawtooth signal is then superimposed upon the forward sawtooth signal. This may be accomplished, where the first signal was recorded on film, by merely making a second film exposure. If the forward sawtooth was recorded on magnetic tape, the reverse sawtooth may be recorded on a second tape and the output of the two tapes may then be fed to the input side of a photographic recorder to produce a graphic recording. In either case, the result is a variable density or variable color recording in which the density or color variation is proportional to the period between the points at which polarity of the signal changes. This system of preparing such records is much simpler and requires considerably less equipment than other systems proposed heretofore. In addition, it has the advantage that changes in density or variation are shown on the record at a time corresponding to that at which they actually occurred, rather than at a later period as has been the case with earlier systems.

In a second and generally preferred embodiment of the invention, a reversed sawtooth signal is generated by playing a seismic signal through the apparatus described above in reverse. The initial value of each sawtooth event in this reversed signal is sampled and the sample voltage is maintained until the next sawtooth event occurs and is sampled. The output is a signal having constant amplitude between points corresponding to those in the input signal at which changes in polarity occurred and may be recorded directly as a variable density or variable color trace upon which trace variation is proportional to cycle breadth or frequency. This latter method thus provides an electronic means for preparing such traces without the necessity for preparing both forward and reverse sawtooth signals. This embodiment is somewhat simpler to carry out than the earlier described method and has the same advantages over methods suggested in the past.

Figure 1:
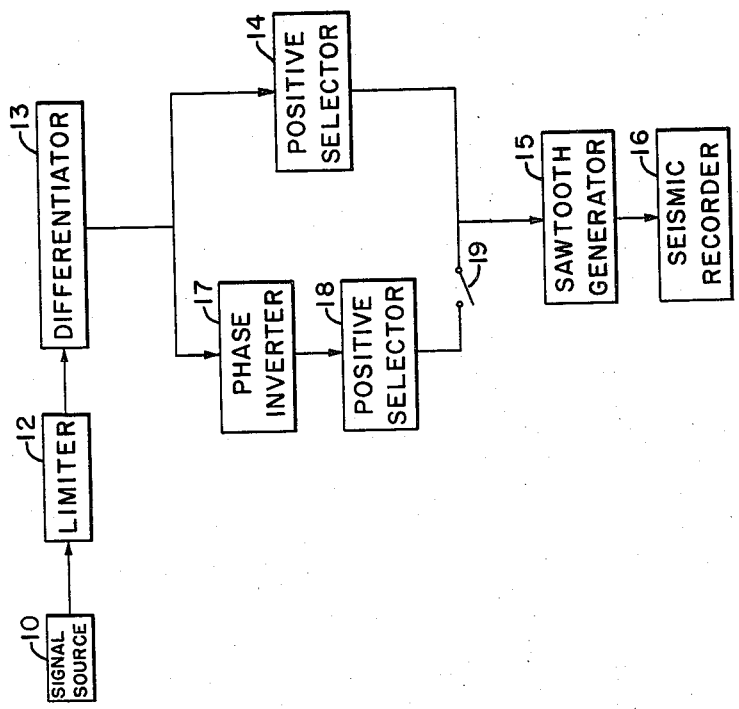

The exact nature and objects of the invention may be more fully understood by referring to the following detailed description of the apparatus used and the methods employed in the practice of the invention and to the accompanying drawings in which:

FIGURE 1 illustrates in block diagram apparatus for producing the sawtooth waveforms employed in the producing of the improved records of the invention;

FIGURE 2 graphically represents wave forms generated during the preparation of a variable density recording wherein each full cycle of the input seismic signal is represented by a discrete density band on the record;

FIGURE 3 is a block diagram of apparatus for converting a reversed sawtooth waveform directly into a photographic trace in accordance with the invention; and FIGURE 4 depicts graphically wave forms generated in the preparation of a recording wherein each half-cycle breadth of the input signal is designated by a distinct density band.

Referring now to FIGURE 1, reference numeral 10 designates a source of seismic signals provided with suitable amplification means. This source will normally be a magnetic tape recording system but it will be recognized that other systems of similar character wherein the output is obtained in the form of a series of electrical transients may be employed. As can be seen from FIGURE 1, the output from this source is passed through a series of electrical components including limiter or clipper circuit 12, a differentiator 13, a positive selector or clamping circuit 14 and a sawtooth generator 15, and is fed into seismic recorder 16. Phase inverter 17 and positive selector 18 are provided in the circuit in parallel to positive selector 14. A switch 19 is provided for inserting the phase inverter and positive selector into the circuit. The limiter, differentiator, phase inverter, positive selector and sawtoothed generator are all conventional items employed in seismic recording systems and similar devices and will be familiar to those skilled in the art.

Seismic recorder 16 may comprise a magnetic tape recorder, a magnetic disc recorder or similar device or may instead be a photographic recorder of the variable density or variable color type. A variety of recording devices of these types are available and are well known to those skilled in the art. If the output from sawtooth generator 15 is recorded on a magnetic tape or disc recorder, it will be necessary to later record the signal from this recorder upon a photographic film in order to obtain a graphic recording susceptible of visual interpretation and analysis and hence both photographic and magnetic recording devices may be utilized.

In employing the apparatus depicted in FIGURE 1 to prepare a variable density or variable color trace in which each full cycle of the input signal is represented by a discrete band of density or color, the apparatus is utilized with switch 19 in an open position. Phase inverter 17 and positive selector 18 are not employed in this application of the equipment. The input seismic signal from source 10 is fed into limiter circuit 12 which clips and amplifies the seismic signal and results in the conversion of the sinusoidal type trace shown as waveform A in FIGURE 2 to a substantially rectangular type wave such as that depicted as waveform B. The leading edges of the rectangular waveform B correspond in time to the points at which the polarity of the original input wave changed from a negative to a positive value. The trailing edges of rectangular waveform correspond in time to the points at which the polarity of the original input signal changed from a positive to a negative value. The rectangular waveform thus generated is fed to differentiator circuit 14 which generates a sharp positive pulse for each leading edge of waveform B and a sharp negative pulse for each trailing edge of the waveform. The resulting sharply pulsed waveform obtained from differentiator circuit 13 is illustrated by waveform C of FIGURE 2. This waveform is then fed to positive selector or clamping circuit 14 which eliminates or cuts off the negative pulses of the waveform and in effect results in a wave which has only positive pulses, there being one sharp pulse for each leading edge of the rectangular waveform which was introduced into differentiator 14. The output signal obtained from positive selector 14 is shown as waveform D. This series of sharply peaked positive pulses is then introduced into sawtooth generator 15. Each positive pulse triggers a linearly rising voltage ramp from the sawtooth generator. The ramp continues to rise linearly until the sawtooth generator receives the next succeeding pulse in waveform D, at which time the generator voltage is reset to zero and begins to rise again. This process continues until a series of sawtooth events has been generated. Each sawtooth continues over a time interval proportional to the time interval between adjacent sharply peaked pulses in the signal to the sawtooth generator and the height of each sawtooth is proportional to the duration of the signal. The resulting waveform is shown as waveform E. The waveforms which make up FIGURE 2 are all drawn on the same time scale and hence the relationship of the events in the various waveforms can readily be observed.

When a series of sawtooth events such as that depicted by waveform E in FIGURE 2 is recorded in the form of a variable density or variable color recording, each sawtooth event appears as a discrete band which varies over its width in color or density depending on the height and duration of the individual event. Each such wave corresponds to a full cycle in the input seismic signal. Each full cycle in the original input signal is thus represented by a discrete band which increases from a minimum density or color variation to a value which is determined by the breadth of the cycle recorded. The rate at which density or color variation changes during each band will depend largely upon the characteristics of the sawtooth generator. Use of a generator which produces only gradually rising increases in voltage will result in a record wherein the changes in density or color variation which occur in each band are less apparent than those which will occur if a sawtooth generator productive of a rapidity rising voltage ramp is used. The seismic frequency range extends from about 10 to about 100 cycles per second but the frequency range most indicative of subsurface conditions lies between about 25 and about 80 cycles per second. The slope of the sawtooth events generated should be such as to give a full range of density or color variation presentations within the desired frequency band. Characteristics of the photographic recording system to be employed will, of course, have to be considered in determining a proper sawtooth generator. Normally these factors will be correlated so that any voltage on the ramp greater than that representative of about 80 cycles per second is shown on a photographic record as a black or blue colored area and any voltage on the ramp representing a frequency less than about 25 cycles per second will be presented as a white or red colored area. It will be understood, of course, that these values are intended merely to be representative values and are not limiting. The frequency range of interest may vary somewhat depending upon the geographical area in which seismic prospecting operations are carried out.

Although the sawtooth wave form thus generated, when recorded in variable density or variable color form, results in a record which permits cycle breadth and hence frequency to be determined, such a record is more difficult of interpretation than a record wherein each cycle in the original signal is represented by a discrete band of constant density or color spectrum. It is a record of the latter type which the process of the present invention affords. In order to obtain such a record, a forward sawtooth waveform such as that described in the preceding paragraphs may be first generated and recorded in the manner set forth above. A reverse sawtooth is then prepared by feeding the original seismic signal through the system in reverse. Differentiator 13, positive selector 14 and sawtooth generator 15 function in the manner described above, but, because of the reversal of the original input signal, the sawtooth wave form obtained has its peaks going in the opposite direction. This second sawtooth waveform is shown as waveform F of FIGURE 2. It will be noted that the individual sawtooth events in waveforms E and F complement each other. When these two series of sawtooth events are superimposed one upon another, the result is a series of discrete bands of constant amplitudes. Each such band represents a full cycle in the original input seismic signal. Such a waveform is shown as waveform G of FIGURE 2. It is obvious that a waveform of this type permits the period of each full cycle in the original input signal to be more readily classified than does a waveform of the sawtooth type.

Several different methods may be employed to obtain a visual trace corersponding to the waveform shown as waveform G in FIGURE 2 of the drawing. Where the forward sawtooth originally prepared was photographically recorded, the reverse sawtooth later obtained can readily be superimposed upon the original record by merely feeding the reverse waveform to a photographic recorder and re-exposing the film. This may be done in either variable density or variable color form. If the forward sawtooth was recorded on magnetic type or a similar medium for later transposition to a photographic record, the reverse sawtooth may be similarly recorded. The two magnetic records may then be played back, their outputs combined and the resultant wave may then be fed to a variable density or a variable color device. Either method results in a photographic record wherein each full cycle of the original input seismic signal is represented by a distinct band of constant density or constant color variation.

The preferred method for preparing a visual trace corresponding to waveform G of FIGURE 2 is carried out with the apparatus shown in FIGURE 3 of the drawing, This apparatus comprises a source 20 of a reversed sawtooth signal generated in the manner described above, a sampler 21, a differentiator 22, a positive selector 23 and a recorder 24. The reversed sawtooth signal may be taken directly from sawtooth generator 15 of FIGURE 1 or may be obtained by playing back a magnetic tape or similarly reproducible recording of the output of generator 15 made in recorder 16 of FIGURE 1. Source 20 may thus represent either the sawtooth generator or a suitable playback device.

The reversed sawtooth signal obtained from source 20 is fed simultaneously into sampler 21 and differentiator 22. Sampler 21 may be any of a number of conventional sampling circuits adapted to sample each sawtooth event in the input signal and maintain the voltage level thereof until the next sawtooth event occurs. Several circuits suitable for this are described in chapter 14 of "Waveforms" by Chance and others which was published as volume 19 of the Massachusetts Institute of Technology Radiation Laboratory Series by the McGraw-Hill Book Company (1949). Differentiator 22 may be similar to differentiator 13 of FIGURE 1 and is of conventional design. The output of the differentiator is a sharply-peaked pulsed signal. This signal is then passed through positive selector 23, similar to positive selectors 14 and 18 of FIGURE 1, where negative components of the signal are eliminated. The pulsed output from the positive selector is introduced into the sampler to trigger its action. The sampler output consists of a signal having constant amplitude between points corresponding to points in the original input signal where changes in polarity occurred. This output signal may then be fed directly into photographic recorder 24 to produce a visual trace on which each full cycle of the original input seismic signal is represented by a distinct band of constant intensity. The trace may be either a variable density trace or a variable color trace and hence the bands may appear as bands of constant density or as bands of constant color variation.

As mentioned earlier, the method of the invention may also be employed to produce variable density or variable color recording wherein each half-cycle of the original input signal is represented by a distinct band of constant density or color variation. Waveforms produced in such an operation are shown in FIGURE 4 of the drawing. In preparing a record of this latter type, switch 19 in the apparatus shown in FIGURE 1 is closed so that phase inverter 17 and positive selector 18 are included in the active circuit. An input seismic signal from source 10 is again passed through limiter 12 and differentiator 13. Assuming that the input signal had the same characteristics as that employed in preparing the full-cycle breadth presentation previously described, the outputs of limiter 12 and differentiator 13 will be identical to those previously obtained. Waveforms A, B, and C in FIGURE 4 representing the original signal and these output signals are therefore identical to waveforms A, B, and C in FIGURE 2. The output from differentiator 13 is fed to positive selector 14 and to phase inverter 17 simultaneously. The operation of positive selector 14 is unchanged and the output thereof is thus the same as that which was obtained in the previous operation. Waveform D in FIGURE 4 representing the output of the positive selector is therefore identical to waveform D in FIGURE 2.

The signal fed to phase inverter 17 from differentiator 13 is inverted by the phase inverter. Waveform E of FIGURE 4 is therefore an inverted replica of waveform C of the same figure. Positive selector 18 receives the inverted waveform and clips the negative portion thereof from it, leaving only the positive pulses as illustrated by FIGURE 4 waveform F. With switch 19 closed, positive pulses from positive selector 18 join the positive pulses from positive selector 14 and the resulting waveform has the characteristics shown by FIGURE 4 waveform G. This waveform has a sharply peaked pulse corresponding to each point in the original input seismic signal at which polarity of the signal changed from positive to negative or from negative to positive. The interval between each positive pulse thus represents a half cycle in the original seismic signal. Waveform G is then fed into sawtooth generator 15. Each positive pulse in the input wave form triggers the sawtooth generator to generate a linearly rising voltage ramp. The ramp thus generated continues to rise until the next positive pulse occurs, resetting the sawtooth generator to a zero voltage and triggering another linearly rising voltage ramp. A sawtooth event corresponding to each half-cycle in the original seismic signal is thus produced. This sawtooth waveform, shown as waveform H of FIGURE 4, has twice as many sawtooth events as the waveform represented as waveform E in FIGURE 2. In other words, waveform H of FIGURE 4 illustrates a half-cycle breadth presentation and has an upwardly rising ramp for each change in polarity of the input seismic signal; whereas the waveform E of FIGURE 2 is a full breadth cycle presentation having one upwardly rising ramp for each change in the polarity of the original seismic signal from a negative to a positive value. In FIGURE 4, waveform H may be recorded on a suitable magnetic medium or as a variable density or variable color photographic trace.

To prepare a trace wherein each half-cycle in the original seismic signal is represented by a distinct band of constant density or color variation in accordance with the invention, a reversed sawtooth waveform such as that shown as waveform I of FIGURE 4 is prepared by playing back the original seismic signal in reverse through the apparatus. Again it will be noted that the individual sawtooth events in waveform I complement those in waveform H in FIGURE 4. When these two series of sawtooth events are superimposed upon one another the result is a waveform in which each half cycle of the original seismic signal is represented by a band of constant density or constant color variation. This superimposing step may be carried out by re-exposing a photographic trace of the forward sawtooth waveform to the reverse waveform in a suitable photographic recorder of the variable density or variable color type, or by preparing separate magnetic recordings of the two, combining the outputs of the two magnetic recordings and feeding the combined outputs to a variable color or variable density photographic recording. As pointed out in conjunction with the discussion of methods for the preparation of full cycle breadth presentations, however, the preferred method of preparing a visual trace is to feed the reversed sawtooth signal through a sample-and-hold circuit such as that represented in FIGURE 3 of the drawing and then pass the resulting signal into a variable density or variable color recorder. The waveform of the resultant is shown as FIGURE 4 waveform J. Variable density or variable color traces prepared from such a waveform are much more susceptible to interpretation and analysis by trained geophysicists than are traces prepared from the sawtooth type waveforms.

It should be noted that each full cycle breadth or each half cycle breadth in the waveforms produced in accordance with the invention, and in variable density or variable color photographic traces produced from such waveforms, is represented by a distinct band of constant density or constant color variation which occurs during that cycle or half cycle. No displacement of the constant density or color variation band occurs during the processing and recording of the seismic information. This constitutes an important advantage for the process of the invention over processes proposed heretofore wherein each positive cycle width or half cycle width is represented by a certain fixed density or color intensity during the following cycle or half cycle. Photographic recordings prepared in accordance with the invention can be analyzed and interpreted directly without the necessity of making allowances for such displacement.

Full seismic sections may be prepared and presented in variable density or variable color form by means of the invention. Individual geophone signals, presented in variable density or variable color to reflect frequency variations in accordance with the invention, may be arranged in the same lateral order as the geophone locations corresponding to the individual signals. Spacings between the variable density presentations or variable color presentations of the individual geophone signals are preferably proportioned to the distances between the geophone locations so that the final product is a reasonably accurate map of a vertical cross section of the portion of the earth under study. It will thus be seen that a seismic section can be prepared in accordance with the invention in a manner such that frequencies within the seismic spectrum are readily apparent.

It will be understood that the foregoing description illustrates but does not necessarily limit the apparatus and method which may be employed in accordance with the invention and the numerous modifications may be made without the departing from the scope of the invention. Such modifications will be readily apparent to those skilled in the art.

What is claimed is:

1. A method for recording an electrical signal which comprises converting said signal into a series of reversed sawtooth events, the voltage in each of said sawtooth events decreasing linearly to a base value between points corresponding to polarity changes in the original signal, and thereafter representing each of said sawtooth events upon a photographic trace by a uniform band whose intensity is proportional to the height of the sawtooth event.

2. A method as defined by claim 1 wherein voltages proportional to the heights of said sawtooth events are generated for periods corresponding to the durations of said events and recorded upon said trace.

3. A method as defined by claim 1 wherein each sawtooth event is superimposed upon a similar sawtooth event in which the voltage increases linearly from a base value between points corresponding to polarity changes in the original signal to produce a uniform band upon said trace.

4. A method as defined by claim 1 wherein each sawtooth event corresponds to an interval between successive polarity changes in the original signal.

5. A method as defined by claim 1 wherein each sawtooth event corresponds to an interval between succesive changes in the polarity of the original signal from negative to positive.

6. A method for recording a seismic signal which comprises generating a series of reversed sawtooth events indicating polarity changes in said signal, the voltage in each of said sawtooth events decreasing linearly between points corresponding to polarity changes in the original signal, generating a waveform made up of a series of uniform voltages proportional to the heights of said sawtooth events, each uniform voltage persisting for a period corresponding to the duration of the corresponding sawtooth event, and recording said waveform as a photographic trace in which voltage variations are reflected by variations in trace intensity.

7. A method as defined by claim 6 wherein said waveform is recorded as a variable density photographic trace.

8. A method as defined by claim 6 wherein said waveform is recorded as a variable color photographic trace.

9. A method for recording a seimic signal which comprises generating a series of pulses occurring at changes in the polarity of said signal, generating reversed sawtooth events in response to said pulses, the voltage of each sawtooth event decreasing linearly to a base value during intervals corresponding to intervals between said pulses, sampling the initial voltage of each sawtooth event and maintaining the sampled voltage until the following sawtooth event occurs, and recording the sampled voltages as a variable color seismic trace.

10. A method a defined by claim 9 wherein said signal is converted into pulses occurring at intervals corresponding to the intervals between successive changes in the polarity of said signal.

11. A method as defined by claim 9 wherein said signal is converted into pulses occurring at intervals corresponding to the intervals between alternate changes in the polarity of said signal.

12. A method of recording a seismic signal which comprises generating a series of forward sawtooth events indicating polarity changes in said signal, the voltage in each sawtooth event increasing linearly between points corresponding to changes in the polarity of the original signal, recording said sawtooth events as a photographic trace, the intensity of said trace varying with variations in signal amplitude, generating a series of reversed sawtooth events indicating polarity changes in said signal, the voltage in each reversed sawtooth event decreasing linearly between points corresponding to changes in the polarity of the original signal, and recording said series of reversed sawtooth events upon said trace over said forward sawtooth events.

13. A method of recording a seismic signal which comprises generating a series of forward sawtooth events indicating changes in polarity in said signal, the voltage in each of said forward sawtooth events increasing linearly between points corresponding to changes in signal polarity, generating a series of reversed sawtooth events indicating changes in polarity in said signal, the voltage in each of said reversed sawtooth events decreasing linearly between points corresponding to changes in signal polarity, combining said forward and reversed sawtooth events into a single waveform, and recording said waveform as a photographic trace wherein trace intensity varies with variations in signal amplitude.

References Cited in the file of this patent

UNITED STATES PATENTS

| | | |
|---|---|---|
| 2,083,344 | Newhouse | June 8, 1937 |
| 2,120,971 | Bailey | June 21, 1938 |
| 2,502,938 | Fryklund | Apr. 4, 1950 |
| 2,704,364 | Summers | Mar. 15, 1955 |
| 2,769,683 | Skelton | Nov. 6, 1956 |
| 2,940,061 | Piety | June 7, 1960 |